United States Patent [19]
Kaczynski et al.

[11] Patent Number: 5,315,080
[45] Date of Patent: May 24, 1994

[54] LIMIT SWITCHING APPARATUS WITH DEFINED OVERTRAVEL FOR SPECIMEN PROTECTION ON MICROSCOPES WITH MOTORIZED FOCUSING DRIVE

[75] Inventors: Ulrich Kaczynski, Bad Nauheim; Roland Hedrich, Ehringshausen, both of Fed. Rep. of Germany

[73] Assignee: Leica Mikroskopie und Systems GmbH, Wetzlar, Fed. Rep. of Germany

[21] Appl. No.: 863,130

[22] Filed: Apr. 3, 1992

[30] Foreign Application Priority Data

Apr. 12, 1991 [DE] Fed. Rep. of Germany ........ 4112010

[51] Int. Cl.[5] .................. H01H 3/16; G01N 29/00
[52] U.S. Cl. .................... 200/47; 200/332.1; 359/392
[58] Field of Search ............... 359/392, 382; 200/332.1, 47, 42.01

[56] References Cited

U.S. PATENT DOCUMENTS

| | | | |
|---|---|---|---|
| 2,713,407 | 7/1955 | Miller | 200/42.01 |
| 3,721,759 | 3/1973 | Lang | 178/7.2 |
| 4,480,163 | 10/1984 | Morris et al. | 200/332.1 |
| 5,034,583 | 7/1991 | Benz et al. | 200/332.1 |

FOREIGN PATENT DOCUMENTS

| | | |
|---|---|---|
| 939170 | 2/1956 | Fed. Rep. of Germany . |
| 2258105 | 11/1972 | Fed. Rep. of Germany . |
| 2627486 | 12/1977 | Fed. Rep. of Germany . |
| 3410201 | 10/1984 | Fed. Rep. of Germany . |

OTHER PUBLICATIONS

Patent Abstracts of Japan, vol. 9243, 30 Sep. 1985, Abstract of JP 60 097 265, Fumio for "Protection Apparatus of Ultrasonic Microscope".
Patent Abstracts of Japan, vol. 9243, 30 Sep. 1985, Abstract of JP 60 097 266, Jiyunichi for "Protection Apparatus of Ultrasonic Microscope".
Patent Abstracts of Japan, vol. 9246, 03 Oct. 1985, Abstract of JP 60 098 361, Jiyunichi for "Protective Device of Ultrasonic Microscope".

*Primary Examiner*—Renee S. Luebke
*Attorney, Agent, or Firm*—Foley & Lardner

[57] ABSTRACT

A limit switching apparatus with defined overtravel for specimen-objective protection on microscopes having a motorized focusing drive. A stored focus position or position of the specimen stage can be overtraveled by a fixed amount. The maximum travel path of the specimen stage is additionally limited by a switching rod and a short-circuiting switch, in order to ensure reliable specimen-objective protection even in the event of a fault in the control electronics.

8 Claims, 2 Drawing Sheets

LIMIT SWITCHING APPARATUS WITH DEFINED OVERTRAVEL FOR SPECIMEN PROTECTION ON MICROSCOPES WITH MOTORIZED FOCUSING DRIVE

BACKGROUND OF THE INVENTION

The invention relates to a limit switching apparatus for limiting the movement of a motorized focusing drive, in particular for a microscope having a movable specimen stage.

Reliable specimen/objective protection in microscopy is intended to ensure that the specimen does not come into contact with the chosen objective during focusing, and consequently neither the specimen nor the objective can be damaged.

This problem is solved in the case of manually operating focusing drives by mechanical stops, which block the focusing drive in a certain position, being provided on the microscope stage. Furthermore, mechanical settable locked positions are known, by means of which a set specimen stage position can be fixed reproducibly.

Modern microscope drives have a motorized focusing drive and are equipped with electrical/electronic control devices, by means of which the focus position can be approached and can be stored.

The microscope systems equipped with motorized focusing drives are increasingly used for production inspections, for example in the semiconductor industry. Here it has been found that, under certain circumstances, electronic controls operate unreliably and essential specimen protection cannot be reliably ensured by electronic means.

Furthermore, practice has shown that in production inspections the specimens to be investigated are affected by manufacturing tolerances. For example, microscopes equipped with electronic or mechanical specimen protection cannot be focused sufficiently accurately if the specimen thickness varies. Due to the activated specimen protection, the specimen stage cannot be moved out of the stored focus position closer to the objective and consequently cannot be focused. This has been found to be disadvantageous for production inspections since, for example, in the semiconductor industry the wafers to be investigated may be affected by tolerances of about $\pm 20$ μm. For the exact focusing of such a specimen, the activated specimen protection must first of all be laboriously switched off and then readjusted.

It is therefore an object of the present invention to improve a limit switching apparatus on a motorized focusing drive for a microscope in such a way that, in addition to the specimen/objective protection, a defined further focusing beyond the fixed focus point is permitted.

SUMMARY OF THE INVENTION

This object is achieved according to the invention by a limit switching apparatus for limiting the movement of a motorized focusing drive, in particular for a microscope having a movable specimen stage, wherein, for the defined overtraveling of a stored focusing position, an electric switch is arranged together with an actuating pin in a housing of a switching rod, the actuating pin is non-positively connected to the specimen stage of the microscope and a free working distance is provided between the pin and the electric switch. Advantageous further developments of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The invention is distinguished, inter alia, also by the fact that the travel path between the specimen stage and the objective is limited by an additional short-circuiting switch and therefore the specimen cannot collide with the objective even if the control electronics fail. Furthermore, due to the defined distance between the electric switch and the actuating pin, the overtravel path for the stored focus position is definitively fixed.

BRIEF DESCRIPTION OF THE DRAWINGS

The invention is presented in illustrative embodiments and explained in more detail with reference to the diagrammatic drawings, which are incorporated in and constitute a part of the specification, and in which.

DETAILED DESCRIPTION OF THE PREFERRED EMBODIMENTS

Figure 1:
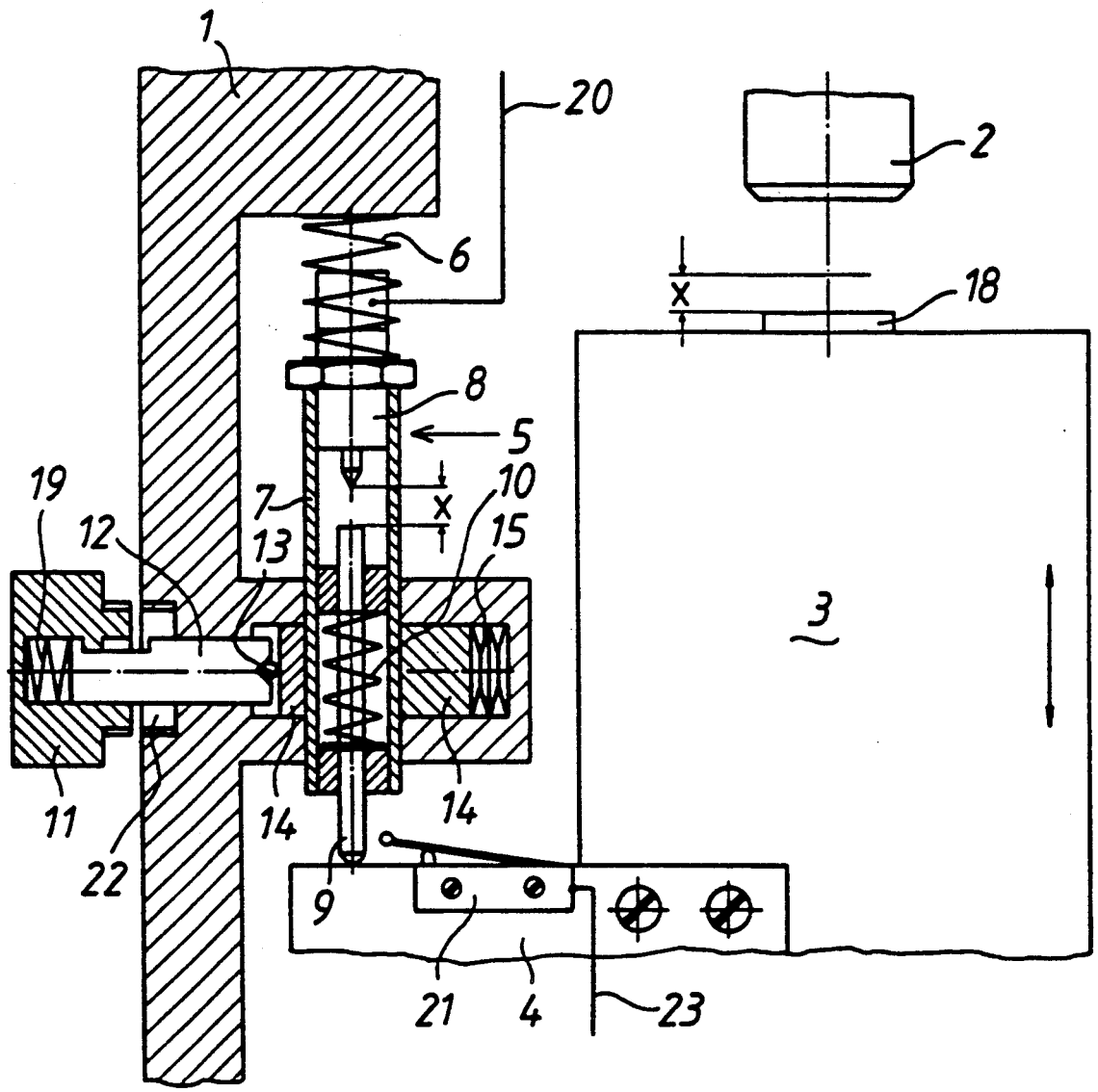
FIG. 1 shows a limit switching apparatus arranged on the microscope stand.

FIG. 1 shows part of a microscope stand 1, a microscope objective 2 and a specimen stage 3 motorized to move in the direction of the arrow and having a first switching lug 4 arranged on it. The latter has a short-circuiting switch 21, which is integrated via a cable connection 23 in the circuit of the focusing motor (not shown).

A limit switching apparatus 5 is connected via a spring 6 to the microscope stand 1. The switching apparatus 5 has a switching rod 7, an actuating pin 9, a spring 10 and an electric switch 8, which is connected via lines 20 to an electrically driven focusing motor (not shown). The actuating pin 9 is restrained in the switching rod 7 by means of a compression spring 10 and is in non-positive connection with the first switching lug 4. The switching rod 7 of the limit switching apparatus 5 is fastened to the microscope stand 1 by means of a releasable clamping parallel to the direction of movement of the specimen stage 3. The clamping is performed by means of a rotatably movable knurled knob 11, a tensioning spring 19, a clamping part 12, a ball 13, a clamping sleeve 14 and a cup spring 15.

The clear distance X between the actuating pin 9 and the electric switch 8 defines the overtravel path X of the specimen stage 3 from the stored focus position with respect to the objective 2. This allows compensation for tolerances in the thickness of the specimen.

The adjustment of the switching rod 7 and the associated fixing of the focus position is performed by a first manually controlled focusing of the microscope. The storing of the focus setting can be performed, for example, by the focusing motor being designed as a stepping motor and by counting the individual steps from a basic position of the specimen stage until the focus position is reached and storing them in a downstream computer/memory device.

After this first focusing of the microscope, the knurled knob 11 is loosened. The switching rod 7 is moved by its own weight and by the force of the spring 6. The actuating pin 9 bears non-positively on the first switching lug 4. By pressing in and locking the knurled knob 11, in a recess 22 provided for the purpose on the stand 1, the switching rod 7 is fixed in the clamping sleeve 14.

The force of the spring 10 is rated to be greater than the weight of the limit switching apparatus 5 itself together with the force of spring 6. This also produces the switching path X between the switching rod 7 and the electric switch 8.

After a specimen change and the associated lowering of the specimen stage 3, the stage 3 can, for example, be reset automatically into the stored focus position. If the thickness of the specimen has changed, the focus is not optimally set and a refocusing is required manually or by means of an autofocusing device. If this new focus position is below the stored position, i.e. the distance between the specimen and the objective 2 is greater, this can be performed by a simple lowering of the stage 3. In contrast to this, the new focus position may also lie above the stored position, i.e. the distance between the specimen and the objective 2 is smaller. In this case, the specimen stage 3 must be moved further in the direction of the objective 2. In this case, it must be ensured that there is no possibility of the specimen 18 colliding with the objective 2. This is ensured by the actuating pin 9 being connected non-positively to the first switching lug 4 and by the pin 9 being pressed into the switching rod 7 in such a focusing operation. The admissible overtravel path, i.e. the path which can be covered by the specimen stage 3 beyond the stored focus position in the direction of the objective 2, is limited by the distance X between the actuating pin 9 and the switching point of the electric switch 8. If the actuating pin 9 is pressed into the switching rod 7 and the electric switch 8 thereby actuated, the motorized focusing drive is switched off by means of its associated electronic control circuit.

If, for example, these control electronics for the focusing drive fail and/or the focusing motor moves the specimen stage 3 in an uncontrolled manner, there is no chance of a specimen/objective collision due to the arrangement of the short-circuiting switch 21 on the switching lug 4. Due to the pressed-in actuating pin 9 in the switching rod 7, the latter will actuate the short-circuiting switch 21 once the admissible overtravel path X has been exceeded. As already mentioned, the switch 21 is integrated directly in the circuit of the focusing motor. Of course, this switching function of the switching rod 7 is only applicable in this illustrative embodiment if the electric switch 8 can still cover an additional path in its housing after its switching point, which is initiated by the actuating pin 9.

The function of the short-circuiting switch 21 can also be realized by the focusing motor being equipped with a slip clutch and the clamping force between the clamping sleeve 14 and the switching rod 7 being rated greater than the force of the focusing motor. The slip clutch is activated by the pressed-in actuating pin 9 in the switching rod 7 and the exceeding of the admissible overtravel path X.

Such a mechanical limitation can, of course, also be brought about by the spring 10 only being able to be compressed by a certain amount (switching travel X) and thereafter the motor slip clutch being activated.

A further possibility of mechanical limitation with a slip clutch can be realized by the focusing motor being able to utilize the clamping force between the switching rod 7 and the clamping sleeve 14 and by the spring 6 serving as a mechanical block.

Figure 2:
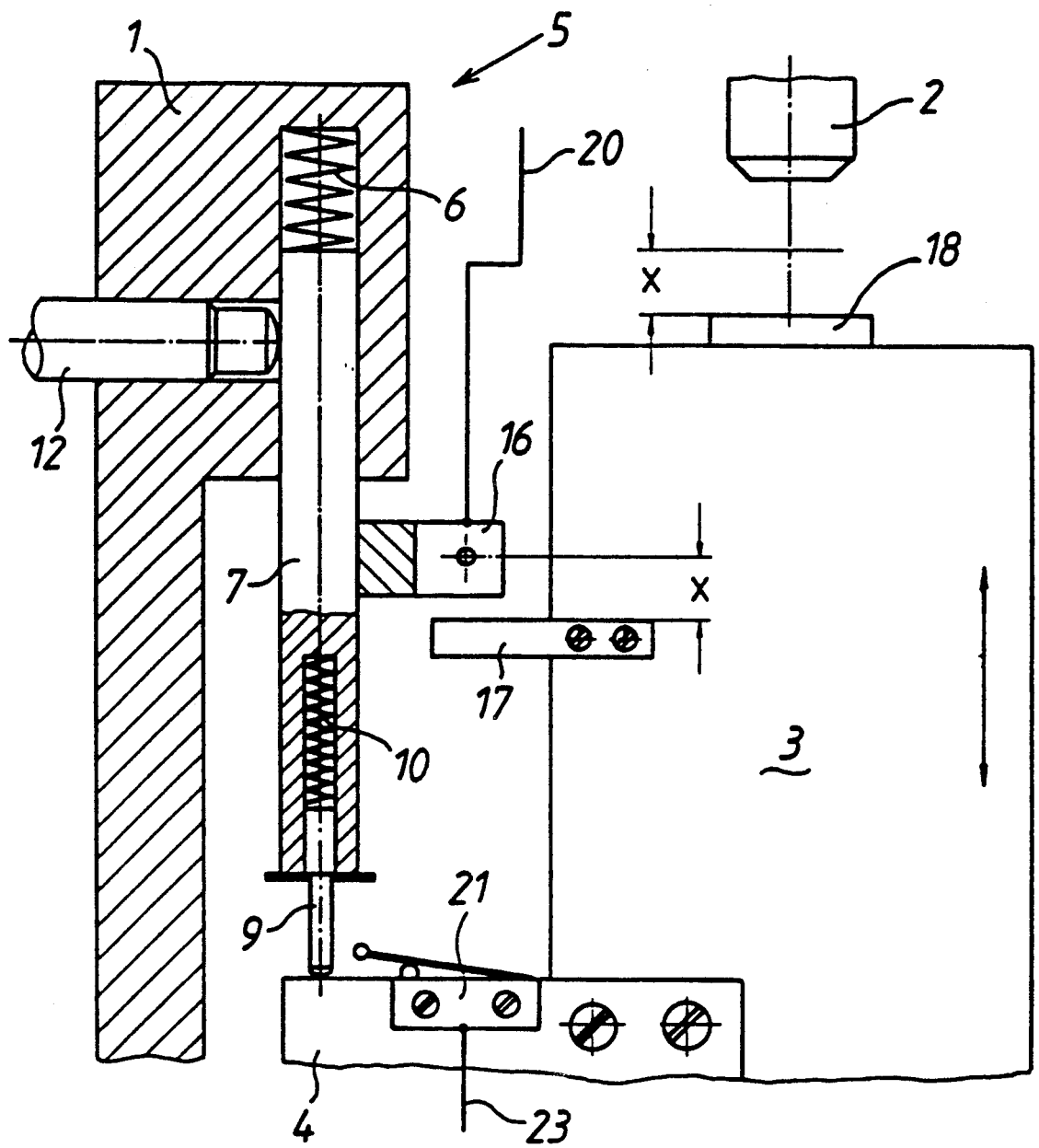
FIG. 2 shows an illustrative embodiment of the limit switching apparatus with a fork light barrier.

FIG. 2 shows a further illustrative embodiment of the invention with a fork light barrier 16, which replaces the electric switch 8 from FIG. 1 and is assigned a second switching lug 17, arranged on the specimen stage 3. The light barrier 16 is connected via the line 20 to the control device for the focusing motor. The clear distance X between the light barrier 16 and the switching lug 17 defines the overtravel path X of the specimen stage 3 from the stored focus position with respect to the objective 2. Arranged on the switching lug 4 is the short-circuiting switch 21, which is integrated in the circuit of the focusing motor via the cable connections 23. The actuating pin 9 is firmly connected to the spring 10 and arranged in the switching rod 7.

The adjustment of the switching rod 7 is performed analogously to FIG. 1 by a first focusing of the microscope.

If switching lug 17 moves past the fork light barrier 16 and the actuating pin 9 is thereby pressed into the switching rod, the motorized focusing drive is switched off by means of the control electronics. In analogy with the illustrative embodiment of FIG. 1, the specimen/objective collision protection is ensured in the event of failure of the control electronics by the switching rod 7 actuating the short-circuiting switch 21 once the admissible overtravel path X has been exceeded.

The function of the short-circuiting switch 21 can, of course, be realized by the already described mechanical variants, using a slip clutch for the focusing motor.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

I claim:

1. A limit switching apparatus for limiting movement of a motorized focusing drive, comprising:
   a microscope having a movable specimen stage;
   a switching rod accommodating an actuating pin; and
   an electric switch arranged together with the actuating pin of the switching rod;
   wherein the actuating pin is non-positively connected to the specimen stage of the microscope and a free working distance is provided between the actuating pin and the electric switch for a defined overtraveling of a stored focusing position.

2. The limit switching apparatus as claimed in claim 1, wherein the actuating pin is resiliently mounted for the non-positive connection with the specimen stage.

3. The limit switching apparatus as claimed in claim 1, wherein the microscope includes a stand,
   wherein the specimen stage moves in a direction, and
   wherein the switching rod is arranged on the microscope stand adjustably along the direction of movement of the specimen stage.

4. The limit switching apparatus as claimed in claim 3, wherein the actuating pin is resiliently mounted for the non-positive connection with the specimen stage.

5. The limit switching apparatus as claimed in claim 1, wherein a switching lug which has a short-circuiting switch, which is actuated by the switching rod, is arranged on the specimen stage.

6. The limit switching apparatus as claimed in claim 5, wherein the short-circuiting switch reaches its switching point after the electric switch.

7. A limit switching apparatus for limiting movement of a motorized focusing drive for a microscope having a movable specimen stage, comprising:
- a switching lug arranged on the specimen stage;
- a switching rod accommodating an actuating pin; and
- a fork light barrier arranged together with the switching rod;
- wherein the actuating pin is non-positively connected to the specimen stage of the microscope and a free working distance is provided between the switching lug and the fork light barrier for a defined overtraveling of a stored focusing position.

8. The limit switching apparatus as claimed in claim 7, wherein a second switching lug which has a short-circuiting switch, which is actuated by the switching rod, is arranged on the specimen stage.

* * * * *